(12) United States Patent
Davis et al.

(10) Patent No.: US 6,508,437 B1
(45) Date of Patent: Jan. 21, 2003

(54) LAUNCH LOCK FOR SPACECRAFT PAYLOADS

(75) Inventors: Toren S. Davis, Peoria, AZ (US); Jack H. Jacobs, Glendale, AZ (US); Steven L. Hadden, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/050,066

(22) Filed: Jan. 15, 2002

(51) Int. Cl.[7] .............................................. B64G 1/64
(52) U.S. Cl. ................... 244/158 R; 244/161; 292/256; 292/DIG. 66
(58) Field of Search ............................ 244/158 R, 161; 292/256, 32, DIG. 66

(56) References Cited

U.S. PATENT DOCUMENTS

| | | | | |
|---|---|---|---|---|
| 4,753,465 A | * | 6/1988 | Dalby | 244/158 R |
| 4,929,135 A | * | 5/1990 | Delarue et al. | 102/378 |
| 5,160,233 A | * | 11/1992 | McKinnis | 411/267 |
| 5,245,738 A | * | 9/1993 | Johnson | 29/413 |
| 5,718,531 A | * | 2/1998 | Mutschler et al. | 294/103.1 |
| 5,771,742 A | * | 6/1998 | Bokaie et al. | 337/140 |
| 6,126,115 A | * | 10/2000 | Carrier et al. | 244/137.4 |
| 2002/0102130 A1 | * | 8/2002 | Nygren et al. | 403/337 |

* cited by examiner

Primary Examiner—Michael J. Carone
Assistant Examiner—Gabriel S. Sukman
(74) Attorney, Agent, or Firm—Robert E. Greenstien

(57) ABSTRACT

A spacecraft payload, suspended by an isolator, is locked down during launch by using a compliant member to pull on a pin, clamping the payload against the launch lock. The payload is unlocked, after launch, by heating a shape memory alloy to move the pin to overcome the compliant member, releasing the payload from launch lock. The payload may be re-locked for reentry by heating another shape memory alloy to push the pin against the other shaped memory alloy.

4 Claims, 1 Drawing Sheet

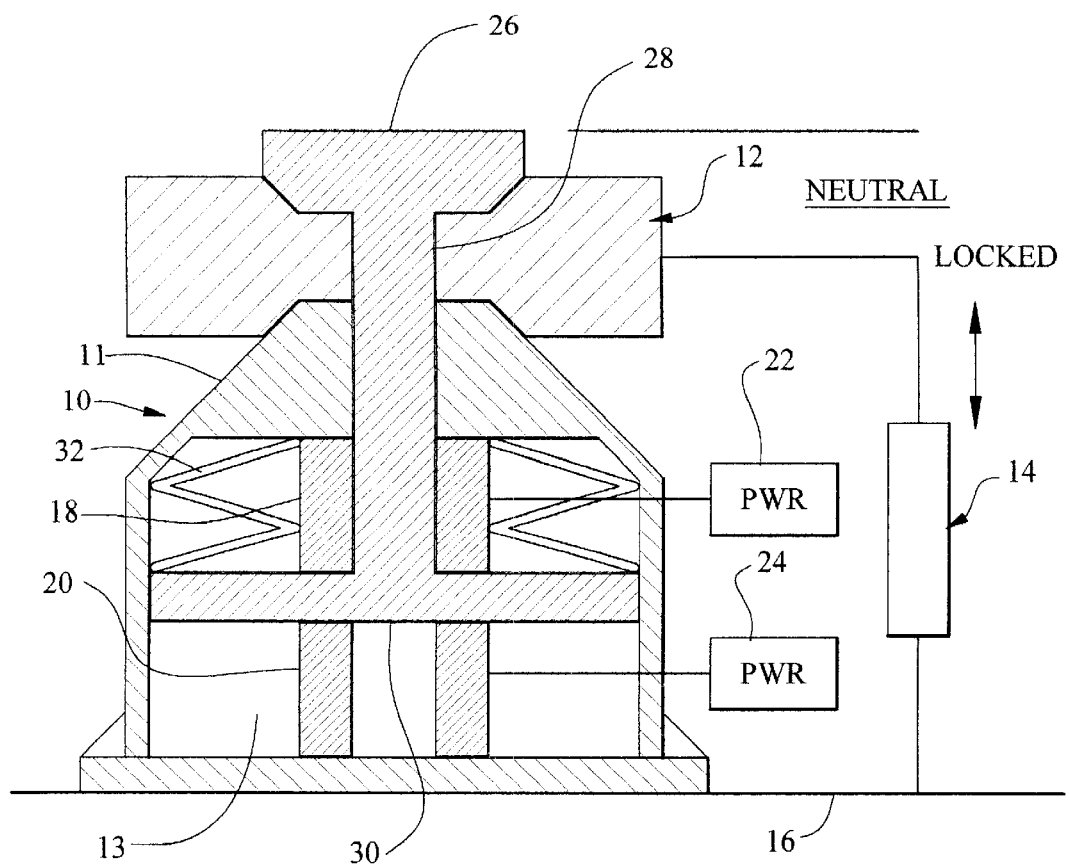

LAUNCH LOCK FOR SPACECRAFT PAYLOADS

BACKGROUND

This invention relates to the use of isolators in connecting spacecraft payloads to a payload platform, in particular, using a launch locking device to restrain the payload and isolator during spacecraft launch.

So-called "launch locks" are called for in many isolated spacecraft payload applications primarily to confine stresses and the isolator stroke during the high g-force conditions that develop during a rocket launch. The isolators comprise a suspension spring and a fluid damper, designed to commonly resonate in the range of 2–10 Hz when supporting the payload. During launch quasi-static and random conditions can conceivably require the compliant isolators stroke between 1 and 20 inches just to prevent the payload from engaging the payload platform. Soft stops can be used as an alternative to launch locks, limiting isolator strokes but nevertheless produce additional shock forces to the payload platform and payload during the launch. Soft stops increase the complexity of the isolator design as well, for instance, in the design of damping elements and flexures for proper operation after launch.

Some locking mechanisms stiffly hold the payload in place by completely restraining the isolator and using bolt cutters, pyrotechnic bolts, separation nuts and Frangibolts to release the payload after launch. But these techniques only provide locking during the launch. None can re-lock the payload and isolator for an earth reentry.

SUMMARY

A compliant member, such as coil spring or belleville spring stack, pulls on a pin clamping the payload against a launch lock housing. After the launch, a release shape memory alloy element is heated to overcome the compliant member, moving the pin away from the lock housing, releasing the payload. The element is substantially sized to hold this new size after the heat is removed.

An additional re-lock shape memory element may be heated, when the spacecraft is ready for reentry, to compress the release shape memory element and move the pin so that the payload is locked against the housing again. Both elements have sufficient cross-sectional area to hold their new sizes after the heat is removed from the re-lock shape memory element.

BRIEF DESCRIPTION OF THE DRAWING

The drawing is a cross section of a payload lock that embodies the present invention and an isolator is connected to the payload.

DESCRIPTION

Nitinol, a shape memory alloy, is known for the special quality of being pliable and easily deformed when it is in a Martensitic form. These materials are able to absorb up to 5% recoverable strain and have deformation stresses between 10,000 and 20,000 psi. When the alloy is heated through its transformation temperature, it changes phase from Martensitic to Austenite, recovering its previous shape but with great force. The Austenite phase increases the yield strength of the alloy to as much as 70,000 psi during strain recovery.

Once the alloy has cooled, it returns to the Martensitic condition and can be easily deformed from that condition once again.

In the drawing, a launch lock 10 is used to lock down a payload 12. When unlocked, payload 12 is suspended by an isolator 14 above a payload platform 16, at an isolator "neutral position". This launch lock 10 contains two independently functioning shape memory tubular alloy elements, lock element 18, release element 20, each having its own power supply 22, 24 by which it can be heated to grow to large size. The element recovers the strain that was mechanically set into it at room temperature before heating and it remains large even after it cools. The launch lock 10 is generally cylindrical with a conical top 11, a locking pin 26, attached to the payload 12 with a vertical shaft 28 that extends through holes in the payload 12 and tapered top 11. The shaft 28 is attached to a horizontal base plate 30 in the interior 13. The base plate 30 is supported by the release shape memory alloy element 20, which opposes the downward force on the plate 30 produced by a compliant or resilient member 32, such as a coil spring or Belleville washer, that is squeezed between the top portion 11 and the base plate 30. The resilient member 32 surrounds the shape memory alloy 20 and the shaft 28 and pulls the payload 12 firmly against the top portion 11, locking it in a position below the neutral position for the isolator 14 operation in space. With the payload firmly in place, the base plate 30 just touches the lock shape memory alloy element 18. This is the launch condition shown in the drawing. An alternative condition would be to have element 18 preset (mechanically deformed or "loaded") and shorter than the gap between base plate 30 and housing 10. The gap would then be closed when element 20 was actuated placing the assembly in the unlocked position and set for re-lock.

After the launch, when the payload 12 is ready to be unlocked and to return the isolator to its neutral position, power is applied to the shape memory alloy 20. The shape memory alloy 20 heats expanding upward characteristically against the force of the spring 32 and even compressing the other shape memory alloy 18, and as this growth takes place, the locking pin 26 moves upward, freeing the payload 12 from the top of the launch lock 10 and allowing the isolator 14 to push the payload vertically upward to the neutral position. At this point the payload is free of the launch lock 10 and supported by the isolator 14, which contains a spring and damper, all well-known in the art for this particular function. The power is removed and the element 20 holds its enlarged size, while the lock element 18 holds its compressed size, both characteristics of a shape memory alloy. It should be noted that the shape memory alloy element 20 will only hold its expanded shape if the stresses exerted on it by the resilient member 32 are less than the yield strength of element 20 in the Martensite condition.

When the time comes that the payload needs to be re-locked for reentry, the power 22 is activated; the lock shape memory alloy element 18 begins to grow, forcing the base plate 30 down, away from the compliant member 32, clamping the payload 12 back into the condition shown in the drawing, and compressing the release element 20. The elements 18, 20 maintain the new sizes after the power 22 is turned off.

One skilled in the art may make modifications, in whole or in part, to a described embodiment of the invention and its various functions and components without departing from the true scope and spirit of the invention.

What is claimed is:

1. A launch lock for locking a payload, supported by an isolator, comprising:
   a housing;
   a pin that extends into the housing and extends through a lug attached to the payload with an enlarged end fitting that captures the payload lug between itself and the housing;

means for resiliently forcing the pin into the housing to lock the payload;

first means for expanding to and of holding an enlarged shape when heated to force the pin against the spring to unlock the payload; and second means for expanding to and holding an enlarged shape to force the pin against the first means to re-lock the payload.

2. The launch lock described in claim 1, wherein the first and second means comprise shape memory alloys and respective means for heating.

3. The launch lock described in claim 2, wherein;

the locking pin contains a base plate located inside the housing the first and second means are separated by said base plate; and said means for resiliently forcing the pin is located between said base plate and a top of the housing.

4. The launch lock described in claim 3, wherein:

the first and second means and the means for resiliently forcing the pin surround a vertical shaft section of the pin that is attached to said base plate and extends vertically through the housing.

* * * * *

UNITED STATES PATENT AND TRADEMARK OFFICE
CERTIFICATE OF CORRECTION

PATENT NO. : 6,508,437 B1
DATED : January 21, 2003
INVENTOR(S) : Toren S. Davis, Jack H. Jacobs and Steven L. Hadden It is certified that error appears in the above-identified patent and that said Letters Patent is hereby corrected as shown below:

<u>Column 1,</u>
Line 3, please insert the following:

-- This invention was made with Government support under Contract F29601-97-D-0113 awarded by the U.S. Army, Kirtland AFB, New Mexico. The Government has certain rights in this invention. --

Signed and Sealed this

Ninth Day of December, 2003

JAMES E. ROGAN
*Director of the United States Patent and Trademark Office*